Patented Feb. 5, 1924.

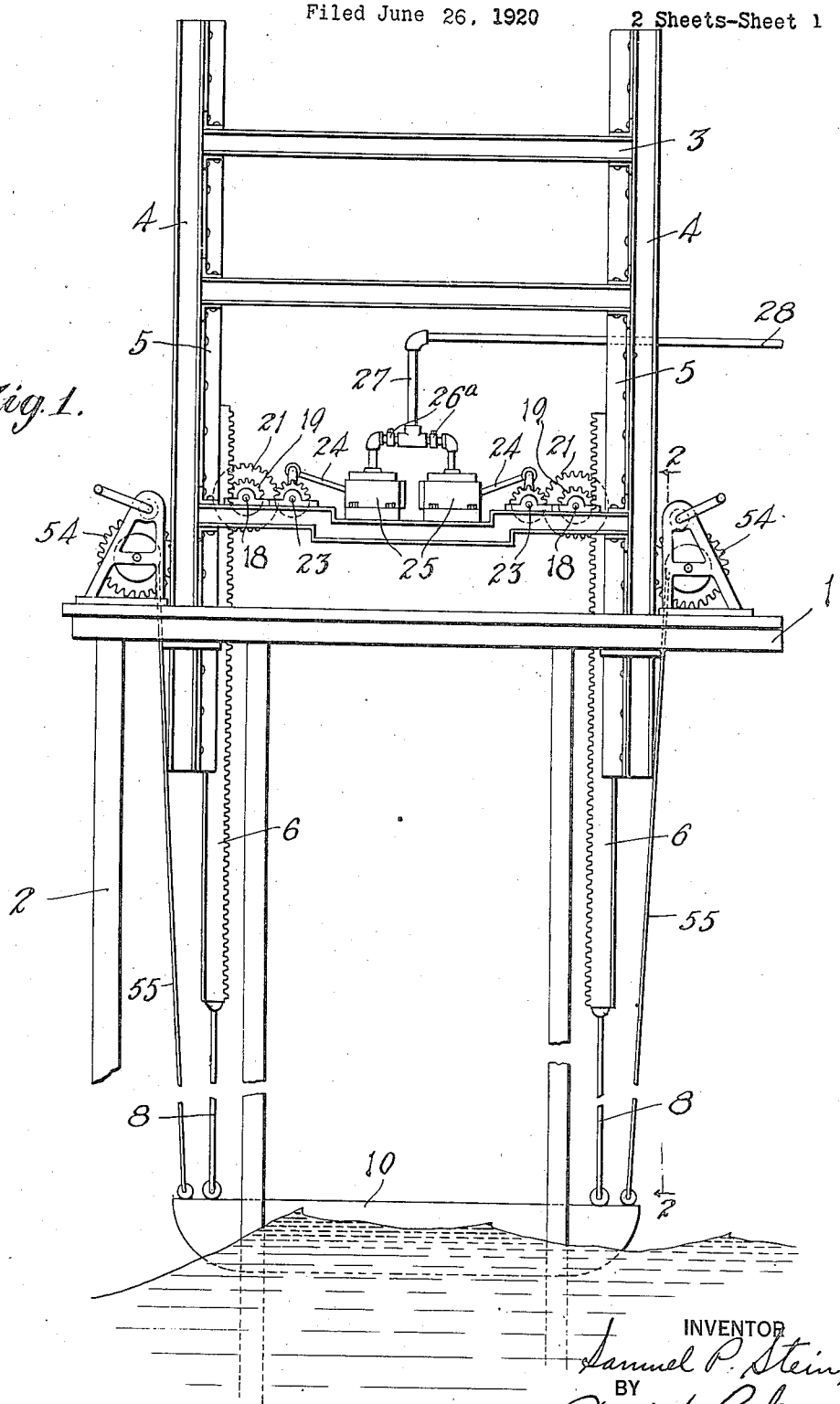

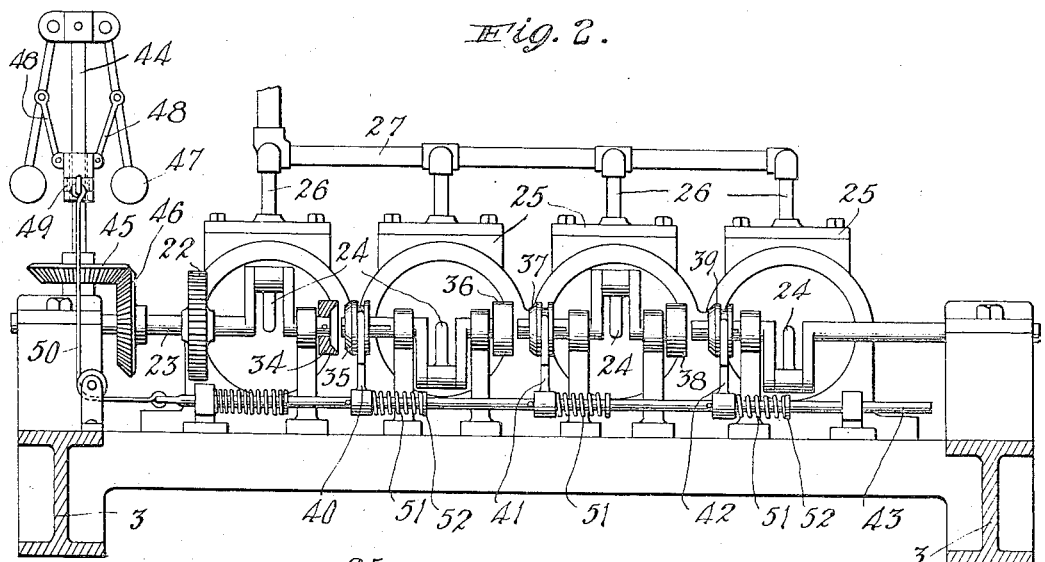
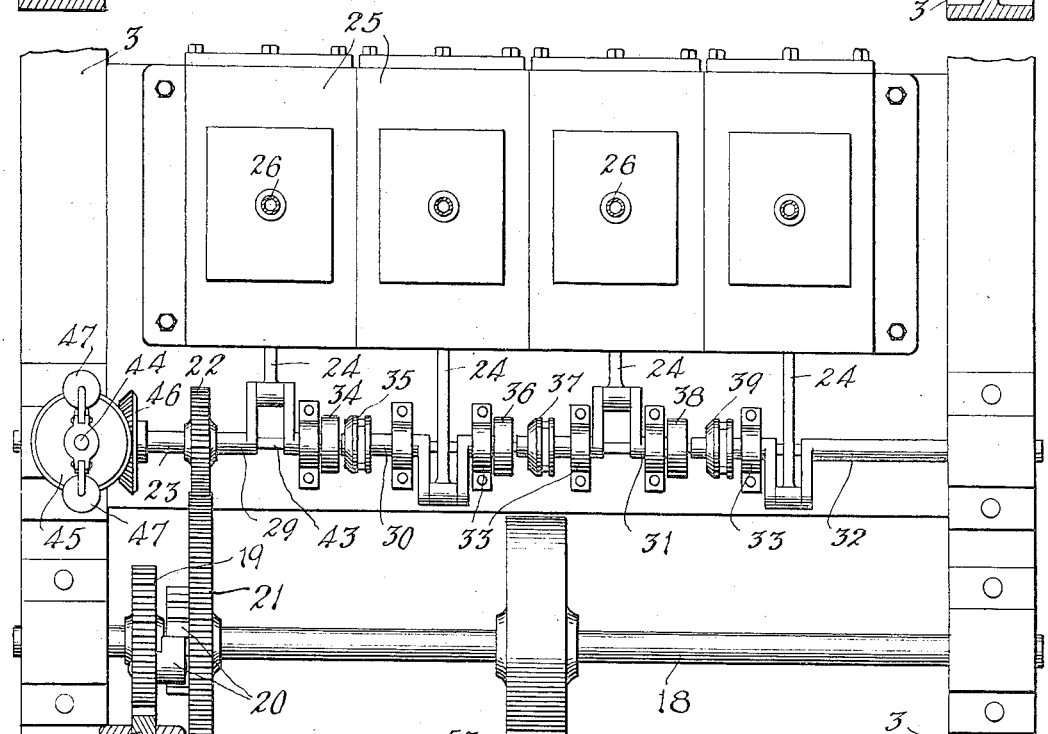

1,482,713

UNITED STATES PATENT OFFICE.

SAMUEL P. STEIN, OF NEWARK, NEW JERSEY.

APPARATUS FOR RECOVERING POWER FROM TIDES AND WAVES.

Application filed June 26, 1920. Serial No. 391,959.

*To all whom it may concern:*

Be it known that I, SAMUEL P. STEIN, a citizen of the United States, and a resident of Newark, in the county of Essex and State of New Jersey, have invented new and useful Improvements in Apparatus for Recovering Power from Tides and Waves, of which the following is a specification.

This invention relates to an improved system of apparatus for the utilization of the energy developed by tidal and wave movements of natural bodies of water, and by the winds, for the production of power for domestic purposes, such as factories, electric lighting, land and marine motor transportation, etc.

The objects of the invention are to provide an improved apparatus for translating the uncontrolled energy of the tides and waves into controllable power; to provide a novel method and apparatus for transmitting the energy developed by the irregular, unsteady and interrupted movements of the tides, waves and winds to continuously operating and steady power producing machinery, such as pumps, electric dynamos, etc.; to provide a system of apparatus comprising a plurality of translating elements for storing the tidal, wave and wind energy in the form of fluid under pressure; to utilize with a series of such translating elements means automatically controlled by variances in the amount of the energy of the natural forces for controlling the operation of said elements; to thus provide means whereby all of said translating elements are thrown into operation when the natural forces are most highly energized; to successively throw some of said elements out of operation upon diminishing of the energy of the tides, waves, or winds, and to successively throw said elements into operation upon increases in said energy; and to obtain other objects and results as may be brought out by the following description.

Referring to the accompanying drawings, in which like numerals of reference indicate the same parts throughout the several views, Figure 1 is a side elevation of my improved system of apparatus for the production of power from the tidal and wave movements and wind currents, portions being broken away and shown in section;

Figure 2 is an enlarged vertical sectional view taken on the line 2—2 of Fig. 1;

Figure 3 is a top plan view of the apparatus shown in Fig. 2.

In the specific embodiment of the invention shown in the drawings, the numeral 1 designates a pier or other suitable structure which is erected over the body of water which is to constitute the source of power, the said pier extending a suitable distance from the shore of the body of water to obtain the energy from the waves and tide when they are at the height of their energy. The pier 1 may be constructed in any suitable manner, and in the present instance is shown as supported by the piles 2. Mounted upon the pier 1 is a vertical frame work 3 comprising end standards 4 upon which are suitably secured vertical rack guides 5 adapted to slidably receive rack bars 6. Each of the rack bars 6 projects downwardly below the pier 1 and has connected to the lower end thereof in any suitable manner one end of a connecting link 8, the opposite end of which is connected to one end of a float 10. Obviously, as the float is raised by a wave passing beneath the same the rack bars 6 will be forced upwardly, and when the float falls the rack rods will be drawn downwardly.

Adjacent each of the rack bars 6 are horizontal shafts 18 journaled upon the frame work 3, the said shafts having loosely mounted thereon rack pinions 19 which have a pawl and ratchet connection 20 with gear wheels 21 rigid with the shafts 18. The gear wheels 21 mesh with pinions 22 fast upon crank shafts 23 to which are connected the pitmen 24 of the air compressors 25. From this construction it will be seen that movement of the rack bars 6 upwardly by the float 10 will through the pawl and ratchet connection 20 cause a rotation of the shafts 18 and crank shafts 23 in one direction, the pawl and ratchet connection of the pinions 19 with the gears 21 allowing the float to fall freely. Thus, rotation of the crank shafts 23 will cause a reciprocation of the pitmen 24 of the air compressors 25, whereby air will be compressed by the said air compressors. The air compressors 25 may be of any conventional and desirable construction, the details thereof being immaterial to my invention. Each of the compressors is provided with a discharge pipe 26 connected to a manifold pipe 27 which is in turn connected to a main pipe line 28 leading to air receivers or tanks (not shown). Each of the pipes 26 is provided with a check valve 26ª to prevent back flow of the fluid from the main pipe line 28.

In view of the fact that the amount of energy developed by the tides and waves of a body of water varies considerably at different times, it is desirable to have sufficient compressors 25 to recover the maximum amount of energy which the waves may have for compressing the fluid, but if such a number of compressors were permanently connected to the float 10 there would be periods of time when the waves and tide would have insufficient energy to operate the compressors. It is thus an essential feature of my invention to provide means for automatically throwing into operation all of the available compressors 25 when the waves have a maximum amount of energy, and for successively throwing out of operation the compressors 25 as the energy of the waves decreases. For this purpose I have shown in the drawings the crank shafts 23 divided into a number of independent sections corresponding to the number of compressors 25 to which the crank shafts 23 are respectively connected, the said sections 29, 30, 31 and 32 being journaled in supplemental bearings 33. The section 29 of each of the crank shafts 23 is permanently connected through the pinion 22 to the float 10, the end of said section 29 adjacent the section 30 having fast thereon a clutch element 34. A cooperating clutch element 35 has a feather and spline connection with the end of the section 30 adjacent the clutch element 34, the opposite end of said section 30 having fast thereon a clutch element 36 corresponding to the clutch element 34. A clutch element 37 corresponding to the clutch element 35 has a feather and spline connection with the end of the shaft section 31 adjacent the clutch element 36, the opposite end of said section 31 having fixed thereto a clutch element 38 which is adapted to cooperate with a clutch element 39 having a feather and spline connection with the end of the shaft section 32 adjacent the clutch element 38. When the various clutch elements are in their normal inoperative position, the clutch element 37 is slightly further away from its cooperating element 36 than is the element 35 from its cooperating element 34, and the clutch element 39 is spaced slightly further from its cooperating element 38 than is the element 37 from its cooperating element 36. The clutch elements 35, 37 and 39 are operated by respective clutch arms 40, 41 and 42 which have a slidable connection with clutch rods 43 horizontally slidable beneath the crank shafts 23. Governor shafts 44 are vertically journaled upon the frame work 3 and are geared to the respective crank shafts 23 by the bevel gears 45 and 46. Each governor shaft carries the usual pivotally connected ball governors 47 which are adapted to swing outwardly toward a horizontal plane as the speed of rotation of the shaft 44 is increased, the said governors 47 being connected by links 48 to a sleeve 49 slidable on the shaft 44. The sleeve 49 is connected by means of a cord or chain 50 to the adjacent end of the corresponding clutch rod 43, and it will thus be obvious that as the speeds of rotation of the crank shafts 23 increase, the sleeve 49 will be raised upwardly on the shafts 44 which will cause a sliding of the clutch rods 43 tending to throw the respective clutch elements 35, 37 and 39 into operation. The clutch element 35 will be the first one thrown into operative position with respect to its cooperating element 34. Upon a further increase in the speed of rotation of the crank shaft 23 the clutch rod 43 will be slid further so as to throw the next clutch element 37 into operative position, and a still further increase in speed of rotation of the crank shaft will cause the clutch element 39 to be thrown into operative position, so that all of the compressors 25 will be in operation. Obviously, if the clutch arm 40 were fast upon the clutch rod 43 further sliding of the clutch rod after the clutch element 35 was thrown into operation would be prevented, and to overcome this difficulty the clutch arms 40, 41 and 42 are slidable upon the clutch rod 43, being held in normal position by springs 51 interposed between the clutch arms and washers 52 fast upon the clutch rod. Thus, after the clutch element 35 is in operative position the clutch rod 43 is free to slide through the clutch arm 41 so as to operate the other clutch elements 37 and 39. It will be seen that the speed of rotation of the crank shaft 23 is dependent upon the amount of energy in the waves, so that the compressors 25 are automatically thrown into or out of operation upon variances in the amount of power available in the waves. In order to compensate for the slight variances and irregularities in the movements of the waves which might cause rapid intermittent closing and opening of the various clutches, I may provide a fly wheel 53 on the shaft 18, the momentum of which will maintain a constant speed in the crank shafts 23. It will thus be seen that my apparatus provides an improved means for translating the uncontrolled and unsteady energy of the tides and waves into controllable power which can be used for commercial purposes, in the present instance the energy being translated into the form of fluid under pressure; and it will be further seen that the amount of energy stored up or translated by my apparatus is in direct proportion to the amount of energy in the tides or waves, due to my automatic controlling means for throwing into and out of operation the fluid compressors 25. It will be observed that upon the rising and falling of the tide the float 10 will always ride upon the surface of the water, the elevation or lowering thereof by the rise and fall of the tide being allowed by the reciprocation of the rack bars 6. When it is desired to completely throw the apparatus out of operation the float 10 may be raised from the surface of the water by means of the conventional windlasses 54 connected by cables 55 to the opposite ends of the float.

Having thus described my invention, what I claim is:

1. In apparatus of the class described, the combination of a plurality of machines to be driven, an independent drive shaft for each of said machines, clutches between adjacent ones of said drive shafts, and automatic means for successively connecting and disconnecting said drive shafts through said clutches.

2. The combination with a plurality of machines to be driven, and a variable source of power, of a main drive shaft connected to said source of power, a plurality of independent drive shafts one for each of said machines, a plurality of clutches interposed between said main drive shaft and said plurality of independent drive shafts, and means controlled by variations in said source of power for controlling successive actuation of said clutches to successively connect and disconnect said independent shafts to and from said main drive shaft.

3. In apparatus of the class described, the combination of a plurality of machines to be driven, an independent drive shaft for each of said machines, clutches between adjacent ones of said drive shafts, a source of power, an operative connection between said source of power and one of said shafts, and means controlled by variations in the speed of revolution of said last-mentioned drive shaft for successively connecting and disconnecting said drive shafts.

4. The combination with a plurality of machines to be driven, and a variable source of power, of a main drive shaft connected to said source of power, a plurality of independent drive shafts one for each of said machines arranged in alinement with said main shaft, a clutch arranged between each two adjacent ones of said shafts, and means controlled by variations in the speed of revolution of said main drive shaft for controlling successive actuation of said clutches to connect and disconnect said shafts accordingly as the said speed of revolution increases or decreases.

SAMUEL P. STEIN.